US012789772B2

(12) United States Patent
Prim et al.

(10) Patent No.: US 12,789,772 B2
(45) Date of Patent: Nov. 10, 2026

(54) CONTROLLER FOR ESTIMATING INDIVIDUAL AXLE WEIGHTS OF A RAIL VEHICLE, COMPUTER IMPLEMENTED METHOD THEREFOR, COMPUTER PROGRAM AND NON-VOLATILE DATA CARRIER

(71) Applicant: DELLNER BUBENZER AB, Borlänge (SE)

(72) Inventors: Viktor Prim, Sandviken (SE); Svante Lennartsson, Falun (SE)

(73) Assignee: DELLNER BUBENZER AB, Borlänge (SE)

( * ) Notice: Subject to any disclaimer, the term of this patent is extended or adjusted under 35 U.S.C. 154(b) by 6 days.

(21) Appl. No.: 18/863,837

(22) PCT Filed: Jun. 13, 2023

(86) PCT No.: PCT/EP2023/065829
§ 371 (c)(1),
(2) Date: Nov. 7, 2024

(87) PCT Pub. No.: WO2024/008404
PCT Pub. Date: Jan. 11, 2024

(65) Prior Publication Data

US 2025/0282333 A1 Sep. 11, 2025

(30) Foreign Application Priority Data

Jul. 4, 2022 (EP) .................................... 22182891

(51) Int. Cl.
*B60T 8/18* (2006.01)
*B60T 8/17* (2006.01)
(Continued)

(52) U.S. Cl.
CPC .......... *B60T 8/1893* (2013.01); *B60T 8/1705* (2013.01); *B60T 8/172* (2013.01); *B60T 8/58* (2013.01);
(Continued)

(58) Field of Classification Search
CPC ...... B60T 8/1893; B60T 8/1705; B60T 8/172; B60T 8/58; B60T 17/228; B60T 2250/02;
(Continued)

(56) References Cited

U.S. PATENT DOCUMENTS 3,819,004 A * 6/1974 Adde .................... B60T 8/1705 180/197
4,347,569 A * 8/1982 Allen, Jr. .............. B60T 8/1705 318/52
(Continued)

FOREIGN PATENT DOCUMENTS

| | | | |
|---|---|---|---|
| JP | 2012-245808 | A | 12/2012 |
| RU | 2124445 | C1 | 1/1999 |
| WO | 2017/109690 | A1 | 6/2017 |

*Primary Examiner* — Lindsay M Low
*Assistant Examiner* — Brian R Kirby
(74) *Attorney, Agent, or Firm* — Dilworth & Barrese, LLP

(57) ABSTRACT

A rail vehicle (100) has a number of wheel axles (131, 132, 133, 134) and a set of brake units (101, 102, 103, 104) applying respective brake forces to the wheel axles. A power signal ($P_m$) indicates the power needed to accelerate the rail vehicle (100) between first and second speeds ($v_1$; $v_2$) indicated by a speed signal. Based thereon an overall weight ($m_{tot}$) of the rail vehicle (100) is estimated. Wheel speed signals indicate respective speeds ($\omega_1$, $\omega_2$, $\omega_3$, $\omega_4$) of the wheel axles (131, 132, 133, 134). A brake unit (101) gradually applies an increasing brake force to a specific wheel axle (131). During braking, an absolute difference ($|\omega_1-\omega_a|$) is determined between the rotational speed of the specific wheel axle (131) and an average rotational speed
(Continued)

($\omega_a$) of the other wheel axles and in response to the absolute difference exceeding a threshold value, a friction parameter ($\mu_m$) is determined reflecting a friction coefficient ($\mu_e$) between the wheels (121*a*, 121*b*) on the specific wheel axle (131) and the rails (181, 182) upon which the rail vehicle (100) travels. The braking procedure is repeated for each of the wheel axles to estimate a respective fraction ($m_1$, $m_2$, $m_n$) of the overall weight ($m_{tot}$) carried by each of said wheel axles.

11 Claims, 4 Drawing Sheets

(51) Int. Cl.
*B60T 8/172* (2006.01)
*B60T 8/58* (2006.01)
*B60T 17/22* (2006.01)

(52) U.S. Cl.
CPC ......... *B60T 17/228* (2013.01); *B60T 2250/02* (2013.01)

(58) Field of Classification Search
CPC .... B60T 8/3235; B60T 13/665; B60T 8/3245; B60W 10/184; B60W 40/068; B60W 2040/1307; B60W 2300/13; B60W 2510/085; B60W 2510/18; B60W 2520/28; B60W 2710/18; B60W 40/13; G01G 19/045; G01G 19/086
See application file for complete search history.

(56) References Cited

U.S. PATENT DOCUMENTS

| | | | | |
|---|---|---|---|---|
| 4,775,197 | A * | 10/1988 | Biegel | B61H 13/20 303/22.2 |
| 4,896,090 | A | 1/1990 | Balch et al. | |
| 5,344,222 | A * | 9/1994 | Helldorfer | G01L 5/28 303/166 |
| 5,544,057 | A | 8/1996 | Matsuoka | |
| 5,820,226 | A * | 10/1998 | Hart | B60T 13/665 303/7 |
| 8,645,011 | B2 * | 2/2014 | Schaffler | B61L 25/021 701/19 |
| 8,972,144 | B2 * | 3/2015 | Herden | B60T 8/1705 701/81 |
| 9,254,830 | B2 * | 2/2016 | Schneider | B60T 17/228 |
| 9,845,084 | B2 * | 12/2017 | Kumar | B60T 8/175 |
| 10,308,265 | B2 * | 6/2019 | Fahmy | B61L 23/044 |
| 2003/0200020 | A1 * | 10/2003 | Ring | B60T 13/665 701/70 |
| 2008/0051967 | A1 * | 2/2008 | Tarnow | B60L 3/10 701/71 |
| 2009/0095195 | A1 | 4/2009 | Kumar et al. | |
| 2011/0089755 | A1 * | 4/2011 | Itano | B60T 17/228 303/14 |
| 2018/0059002 | A1 * | 3/2018 | Vlasichev | G01N 19/02 |
| 2019/0001822 | A1 * | 1/2019 | Tione | B60L 3/10 |
| 2019/0359189 | A1 * | 11/2019 | Rasel | B60T 8/1705 |
| 2021/0114570 | A1 * | 4/2021 | Hirokawa | B60T 8/1761 |
| 2021/0284110 | A1 * | 9/2021 | Kumar | B60T 8/1705 |

* cited by examiner

CONTROLLER FOR ESTIMATING INDIVIDUAL AXLE WEIGHTS OF A RAIL VEHICLE, COMPUTER IMPLEMENTED METHOD THEREFOR, COMPUTER PROGRAM AND NON-VOLATILE DATA CARRIER

TECHNICAL FIELD

The present invention relates generally to safety arrangements for rail vehicle braking systems. Especially, the invention relates to a controller according to the preamble of claim 1 for estimating individual axle weights of a rail vehicle to enable enhanced braking of the rail vehicle. The invention also relates to a corresponding computer-implemented method, a computer program and a non-volatile data carrier storing such a computer program.

BACKGROUND

In operation of an electrically powered rail vehicle, the onboard motors are typically engaged as generators to decelerate the rail vehicle. However, for efficiency and safety reasons, one cannot rely solely on this braking strategy. In particular, a dedicated brake function will always be needed to ensure emergency braking functionality and that the rail vehicle remains stationary after that it has been brought to a stop. In many cases, the same brake units are used for different types of braking functionality, such as service braking, emergency braking and parking braking.

When braking a rail vehicle it is key to have accurate information about the adhesion conditions at the wheel-rail interface, i.e. the applicable kinetic friction coefficient. However, to accomplish a truly efficient retardation of the rail vehicle it is further important to know how the rail vehicle's weight is distributed over its wheel axles. Namely, only a comparatively low brake force can be applied to a relatively lightly loaded axle before its wheels start to slide against the rails, whereas a relatively heavily loaded axle may be subjected to a comparatively high brake force before its wheels starts to slide against the rails. Both for efficiency reasons and to avoid material damage, primarily on the wheels, wheel sliding shall be avoided as far as possible. Therefore, in many cases, to be on the safe side, an estimated lowest axle weight may determine the maximum brake force that can be applied by the rail vehicle. Of course, this results in an overall suboptimal braking performance.

Various attempts have been made to determine the total weight of a vehicle. For example, U.S. Pat. No. 9,358,846 describes a load estimation system and method for estimating vehicle load. The system includes a tire rotation counter for generating a rotation count from rotation of a tire; apparatus for measuring distance travelled by the vehicle; an effective radius calculator for calculating effective radius of the tire from the distance travelled and the rotation count; and a load estimation calculator for calculating the load carried by the vehicle tire from the effective radius of the tire. A center of gravity height estimation may be made from an estimated total load carried by the tires supporting the vehicle pursuant to an estimation of effective radius for each tire and a calculated load carried by each tire from respective effective radii.

U.S. Pat. No. 9,500,514 shows a method and a system for estimating a weight for a vehicle on the basis of at least two forces which act upon the vehicle. The forces are a motive force and at least one further force, and topographical information for a relevant section of road. The estimation is performed when the at least two forces are dominated by the motive force.

U.S. Pat. No. 9,211,879 discloses devices and methods, which relate to the arrangement of a sensor on the shaft of a rail vehicle to determine its mass. For example, an output signal of an acceleration sensor is evaluated, which is disposed on a shaft of the rail vehicle. The mass of a freight wagon can be determined in that it vibrates in a manner typical to the mass (frequency, amplitude) after impact (switching impact, running over a switch). The impact can be determined in direction and intensity by the acceleration sensor on the shaft (axle), the vibration can be determined by the same acceleration sensor or by a further sensor on the chassis. From this measurement data, the mass of the wagon and the mass of the load with known empty weight and thereby the loading state can be determined.

The above documents describe different strategies for determining the weight as well as other characteristic properties of vehicles. However, there is yet no satisfying solution for establishing how a vehicle's total weight is distributed over its axles, such that for example braking of the vehicle may be improved.

SUMMARY

The object of the present invention is to solve the above problems and offer a solution that enables determining the individual axle weights of a rail vehicle in an accurate and reliable manner.

According to one aspect of the invention, the object is achieved by a controller for estimating individual axle weights of a rail vehicle with a number of wheel axles and a set of brake units configured to apply a respective brake force to each of the wheel axles so as to cause retardation of the rail vehicle. The controller is configured to obtain power and speed signals. The power signal indicates an amount of power produced by an onboard motor to accelerate the rail vehicle from a first speed to a second speed. The speed signal indicates respective values of the first and second speeds. Based on the power and speed signals, the controller is configured to estimate an overall weight of the rail vehicle. The controller is further configured to:

(a) obtain wheel speed signals indicating respective rotational speeds of the wheel axles, (b) produce a brake control signal to a specific brake unit in the set of brake units, such that this brake unit applies a gradually increasing brake force to a specific wheel axle of said wheel axles, (c) determine, repeatedly during production of the brake control signal, an absolute difference between the rotational speed of the specific wheel axle and an average rotational speed of the wheel axles except the specific wheel axle, and in response to the absolute difference exceeding a threshold value (d) determine a parameter reflecting a friction coefficient between a pair of wheels on the specific wheel axle and a pair of rails upon which the rail vehicle travels, repeat steps (a) to (c) for each of the rail vehicle's wheel axles, and based thereon estimate a respective fraction of the overall weight carried by each of said wheel axles.

The above controller is advantageous because it provides accurate values of the overall weight of the rail vehicle as well as the individual axle weights. As a bonus effect, this also enables the rail vehicle to accelerate without risking slippage.

Furthermore, the proposed controller is beneficial, since it allows for dynamic adaptation of the braking functionality during travel in response to redistribution of the load, e.g. due to passengers moving around. More important, the operation of the brakes may be adequately adjusted whenever cargo is loaded and/or unloaded in a very convenient manner.

According to one embodiment of this aspect of the invention, the controller contains at least one interface configured to receive first and second vector signals. The first vector signal expresses an acceleration of the rail vehicle, as such, for instance laterally and vertically. The second vector signal expresses a respective rotational movement of the wheels on each of the rail vehicle's wheel axles. Thus, the rotational movement is performed in a plane being orthogonal to a respective rotation axis of the wheel axle. The controller is configured to obtain the wheel speed signals indicating the respective rotational speeds based on the first and second vector signals. Thereby, accurate values of the wheel speed can be derived without any tachometer. This, in turn, vouches for robust and reliable measurements.

Preferably, the first vector signal further expresses an inclination angle of the rail vehicle relative to a horizontal plane. Namely, this enables the controller to adjust the power signal indicating the amount of power produced by the onboard motor and/or the speed signal indicating the second speed based on the inclination angle when estimating the overall weight of the rail vehicle. Such adjustment is necessary if the overall weight of the rail vehicle is estimated when the rail vehicle travels on non-horizontal ground because in an uphill slope a part of the motor power is converted into potential energy, and conversely, in a downhill slope a part of the kinetic energy originates from potential energy.

According to another embodiment of this aspect of the invention, the controller is configured to provide the respective fractions of the overall weight to a braking controller to enable the braking controller to produce a respective brake force signal to each brake unit in the set of brake units. Hence, respective brake force signals may be based on the respective fractions of the overall weight, and the rail vehicle can be retarded in an optimized manner.

Preferably, in the light of the above, the controller is co-located with the braking controller. For example the controller may be integrated into the braking controller, or vice versa.

According to yet another embodiment of this aspect of the invention, the controller is configured to transmit the brake control signal via a data bus in the rail vehicle. This renders the implementation cost-efficient and flexible.

According to another aspect of the invention, the object is achieved by a computer-implemented method for estimating individual axle weights of a rail vehicle with a number of wheel axles and a set of brake units configured to apply a respective brake force to each of the wheel axles so as to cause retardation of the rail vehicle, which method is performed in at least one processor involves obtaining a power signal indicating an amount of power produced by an onboard motor to accelerate the rail vehicle from a first speed to a second speed, obtaining a speed signal indicating respective values of the first and second speeds, and based thereon estimating an overall weight of the rail vehicle. The method further involves:

(a) obtaining wheel speed signals indicating respective rotational speeds of the wheel axles, (b) producing a brake control signal to a specific brake unit in the set of brake units such that this brake unit applies a gradually increasing brake force to a specific one of the wheel axles, (c) determining, repeatedly during production of the brake control signal, an absolute difference between the rotational speed of the specific wheel axle and an average rotational speed of wheel axles except the specific wheel axle; and in response to the absolute difference exceeding a threshold value (d) determining a parameter reflecting a friction coefficient between a pair of wheels on the specific wheel axle and a pair of rails upon which the rail vehicle travels, repeating steps (a) to (c) for each of said wheel axles, and based thereon estimating a respective fraction of the overall weight carried by each of said wheel axles.

The advantages of this method, as well as the preferred embodiments thereof are apparent from the discussion above with reference to the proposed controller.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
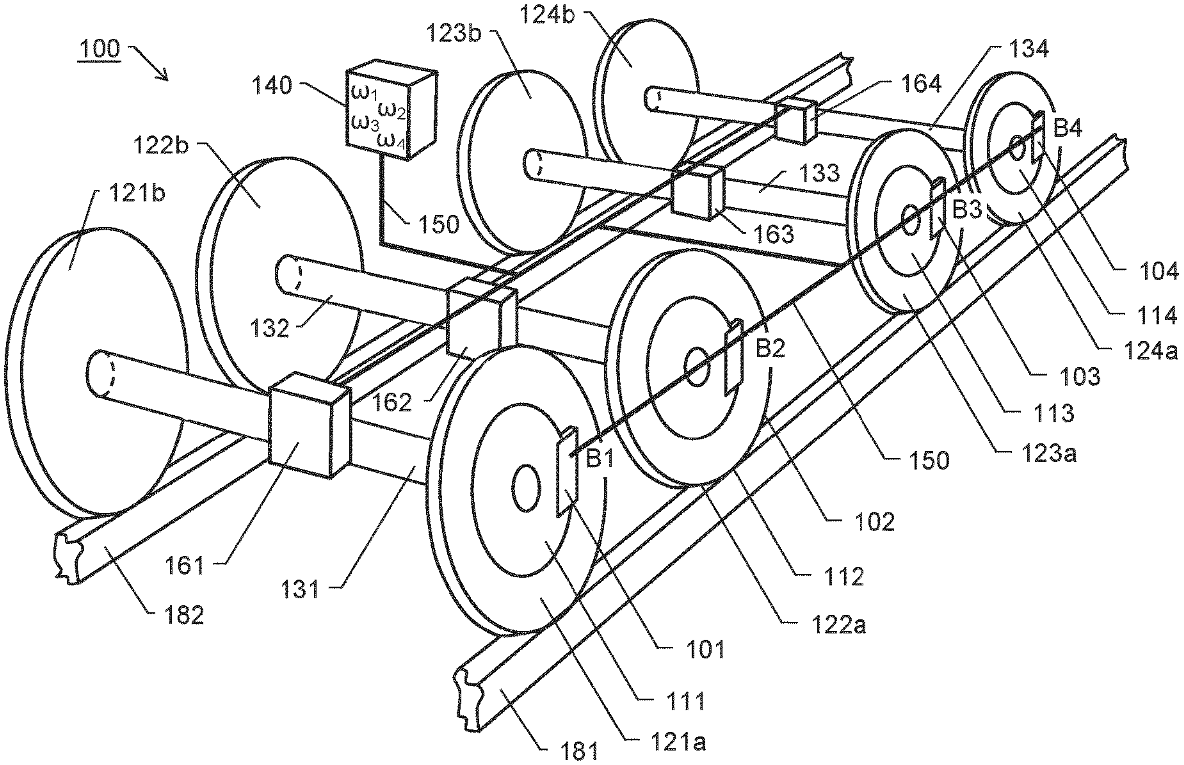
FIG. 1 schematically illustrates a rail vehicle equipped with a controller according to one embodiment of the invention.

In FIG. 1, we see a schematic illustration of a rail vehicle 100 equipped with a controller 140 according to one embodiment of the invention.

The controller 140 is arranged to estimate individual axle weights of the rail vehicle 100, which has a number of wheel axles. FIG. 1 exemplifies four such wheel axles in the form of 131, 132, 133 and 134 respectively. Typically, in practice, a rail vehicle contains a substantially larger number of wheel axles. Traditionally, each bogie has two wheel axles carrying altogether four wheels, and each car body of the rail vehicle 100 includes a respective bogie in the front and rear ends.

The rail vehicle 100 also contains a set of brake units 101, 102, 103 and 104 respectively configured to apply a respective brake force to each of the wheel axles 131, 132, 133 and 134. Consequently, by operating the brake units 101, 102, 103 and 104, the rail vehicle 100 may be caused to retard/decelerate.

Figure 5:
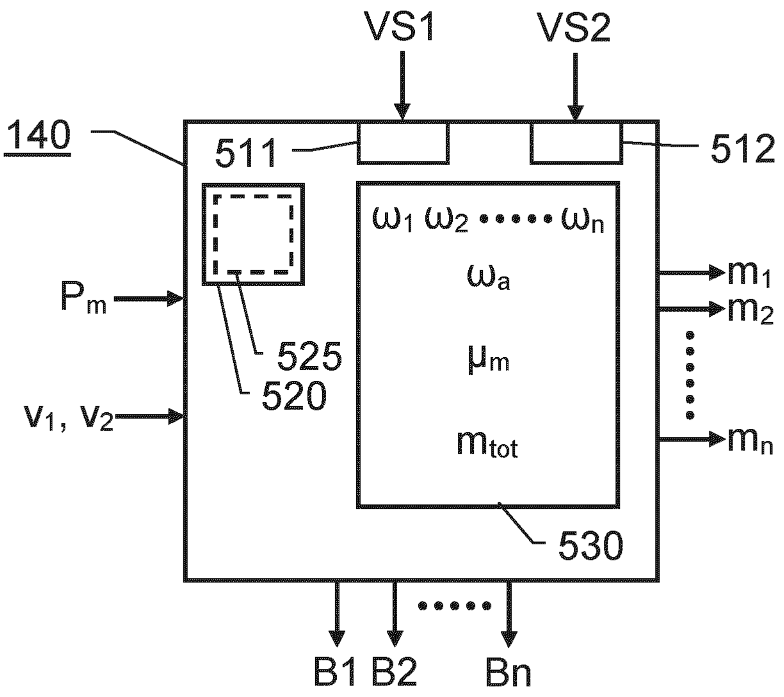
FIG. 5 shows a block diagram of a controller according to one embodiment of the invention.

Referring now to FIG. 5, the controller 140 is configured to obtain a power signal $P_m$ indicating an amount of power produced by an onboard motor to accelerate the rail vehicle 100 from a first speed $v_1$ to a second speed $v_2$, for example from a standstill to 10 km/h. Of course, however, according to the invention, the power signal $P_m$ may equally well be received during acceleration between any other two speed levels. In any case, the controller 140 is configured to obtain a speed signal indicating respective values of the first and second speeds $v_1$ and $v_2$.

Based on the power signal $P_m$ and the values of the first and second speeds $v_1$ and $v_2$, the controller 140 is configured to estimate an overall weight $m_{tot}$ of the rail vehicle 100.

This may be done under the assumption that any losses in the motor and losses due to wind and rolling resistance are negligible, which is basically true for low speeds. Namely, if so, all the supplied power is converted into kinetic energy of the rail vehicle, i.e. $P \cdot t = W_k$, where P is the supplied power, t is the time during which the power has been supplied and $W_k$ is the resulting kinetic energy.

The resulting kinetic energy $W_k$, in turn, may be expressed as:

$$W_k = m_{tot} \cdot v^2/2, \text{ where } v = v_2 - v_1.$$

In other words, the controller 140 may calculate the overall weight $m_{tot}$ of the rail vehicle 100 as:

$$m_{tot} = \frac{(v_2 - v_1)^2}{2Pt}$$

Figure 2:
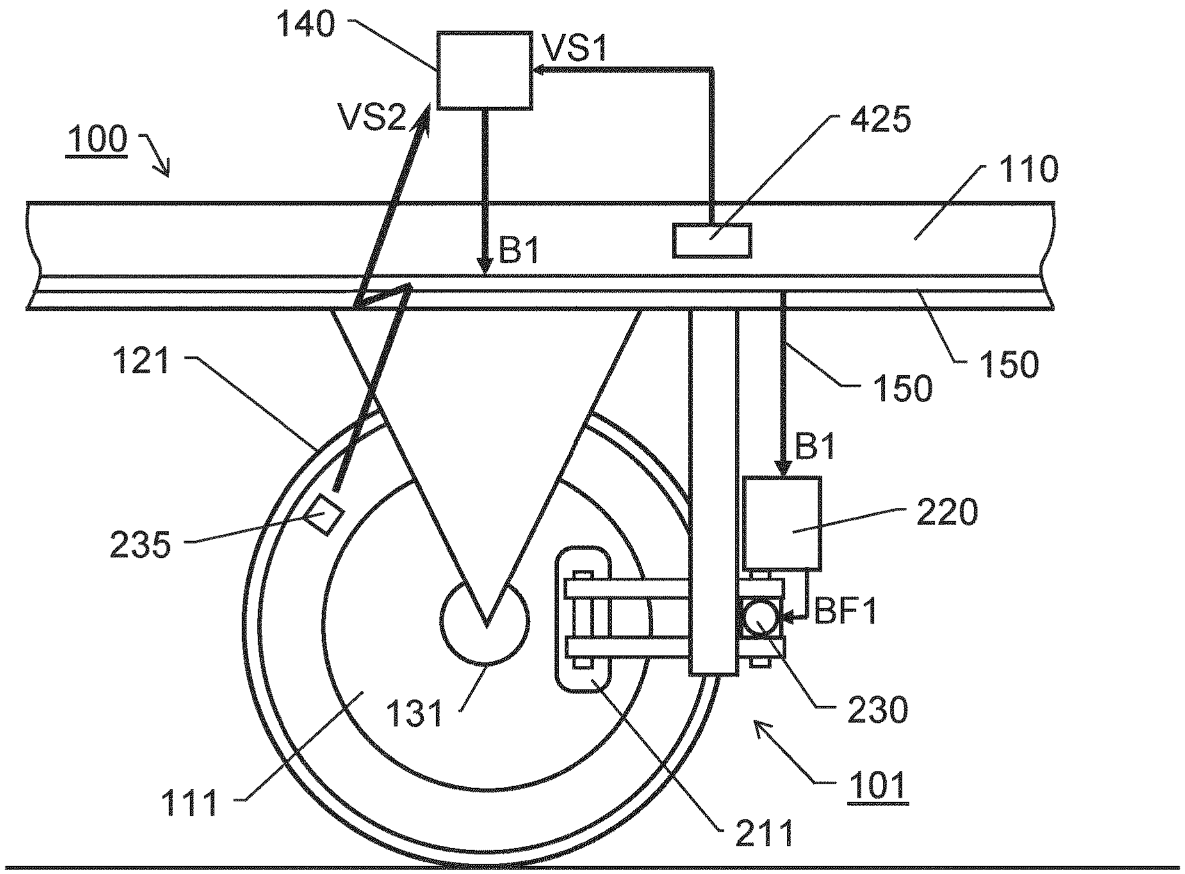
FIG. 2 shows a brake unit according to one embodiment of the invention.

Referring now also to FIG. 2, the controller 140 is further configured to:

(a) obtain wheel speed signals indicating respective rotational speeds $\omega_1$, $\omega_2$, $\omega_3$ and $\omega_4$ of the wheel axles 131, 132, 133 and 134 respectively, (b) produce a brake control signal B1 to a specific brake unit 101 in the set of brake units such that this brake unit 101 applies a gradually increasing brake force to a specific wheel axle in the rail vehicle 100, here exemplified by 131, (c) determine, repeatedly during production of the brake control signal B1, an absolute difference $|\omega_1 - \omega_a|$ between the rotational speed of the specific wheel axle 131 and an average rotational speed $\omega_a$ of all the rail vehicle's 100 wheel axles except the specific wheel axle 131, and in response to the absolute difference $|\omega_1 - \omega_a|$ exceeding a threshold value (d) determine a parameter $\mu_m$ reflecting a friction coefficient $\mu_e$ between a pair of wheels 121*a* and 121*b* respectively on the specific wheel axle 131 and a pair of rails 181 and 182 upon which the rail vehicle 100 travels.

Figure 3:
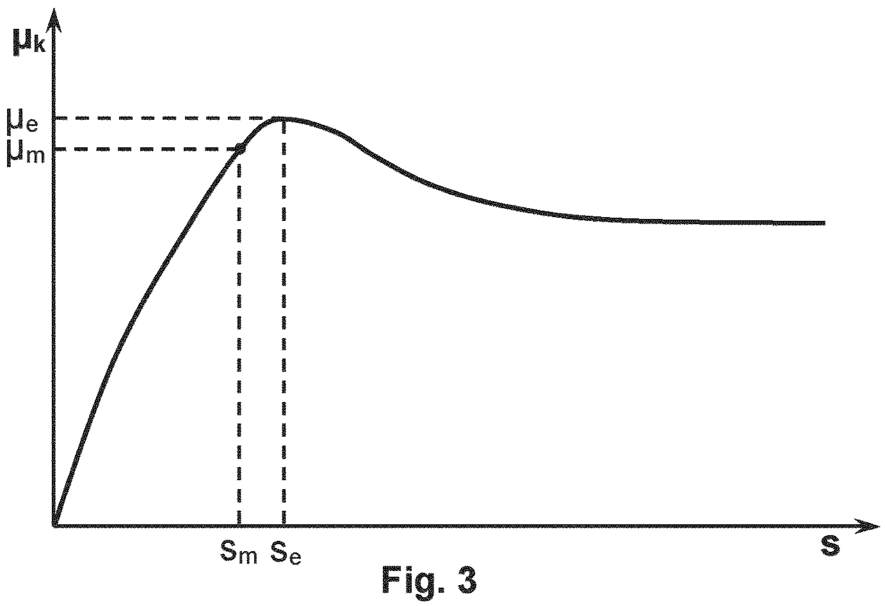
FIG. 3 shows a graph illustrating an example of the friction coefficient as a function of wheel slippage.

FIG. 3 shows a graph illustrating an example of how the kinetic friction coefficient $\mu_k$ may be expressed as a function of the wheel slippage s, which here is understood to designate a sliding motion of the wheel relative to the rail. However, technically, the wheel slippage s may equally well express a spinning motion of the wheel relative to the rail.

In other words, the wheel slippage s is applicable to a retardation scenario as well as an acceleration ditto.

Characteristically, for lower values, the kinetic friction coefficient $\mu_k$ in-creases relatively proportionally with increasing wheel slippage s. When ap-proaching a peak value $\mu_e$, however, the kinetic friction coefficient $\mu_k$ levels out somewhat. After having passed the peak value, the kinetic friction coefficient $\mu_k$ is essentially constant for all values of the wheel slippage s. Thus, the friction coefficient peak value $\mu_e$ is associated with an optimal wheel slippage $s_e$ after which a further increase of wheel slippage s results in a gradually reduced, and then almost constant kinetic friction coefficient $\mu_k$.

According to the invention, a parameter $\mu_m$ is determined that reflects the friction coefficient between the rail vehicle's 100 wheels and the rails 181 and 182 upon which the rail vehicle 100 travels. Ideally, the peak value $\mu_e$ should be derived. For example, the peak value $\mu_e$ may be derived as follows. When the absolute difference $|\omega_1 - \omega_a|$ between the rotational speed of the specific wheel axle 131 and an average rotational speed $\omega_a$ of all the rail vehicle's 100 wheel axles except the specific wheel axle 131 exceeds the threshold value, this corresponds to a situation where the wheels 121*a* and 121*b* on the specific wheel axle 131 experiences a wheel slippage $s_m$ near the optimal wheel slippage $s_e$. The kinetic friction coefficient $\mu_k$ is given by the expression:

$$\mu_k = \frac{F}{m_{tot} \cdot g}$$

where F is the force applied by the brake unit, $m_{tot}$ is the overall weight of the rail vehicle 100, and g is the standard acceleration due to gravity.

Under the assumption that the wheel slippage $s_m$ is near the optimal wheel slippage $s_e$, the peak value $\mu_e$ of the kinetic friction coefficient $\mu_k$ may be estimated relatively accurately; and the proximity of wheel slippage $s_m$ to the optimal wheel slippage $s_e$ is ensured by said threshold value for the absolute difference $|_1 - \omega_a|$ between the rotational speed of the specific wheel axle 131 and the average rotational speed $\omega_a$ of all the rail vehicle's 100 wheel axles except the specific wheel axle 131.

Finally, the controller 140 is configured to repeat steps (a) to (c) for each wheel axle 131, 132, 133 and 134 of the rail vehicle 100, and based thereon estimate a respective fraction $m_1, m_2, \ldots, m_n$ of the overall weight $m_{tot}$ carried by each of these wheel axles.

It is worth mentioning that the above-mentioned specific wheel axle 131 does not need to be any particular wheel axle, e.g. a frontmost or a rearmost wheel axle of the rail vehicle 100. On the contrary, the above procedure may start with an arbitrary selected wheel axle in the rail vehicle 100.

Moreover, it is generally advantageous to execute the above procedure in line with a schedule, fixed or dynamic, wherein each wheel axle in the rail vehicle 100 alternately either represents the specific wheel axle or is included in the complement set, i.e. all the wheel axles except the specific wheel axle. Repeated execution of procedure is nevertheless beneficial to enable adjustment of the braking functionality in response to any changes in the overall weight $m_{tot}$ and/or a redistribution of the overall weight $m_{tot}$ over the wheel axles.

The controller 140 may be configured to produce control signals B1, B2, B3 and B4 to the brake units 101, 102, 103 and 104 respectively, such that an average brake force applied to the wheel axles 132, 133 and 134 except the specific wheel axles 131 is gradually decreased when the brake force applied to the specific wheel axle 131 is gradually increased. In other words, the braking on the other wheel axles 132, 133 and 134 compensate for the somewhat excessive force applied to the specific wheel axle 131.

Preferably, this compensation is temporally matched. This means that the controller 140 is configured to produce the control signals B1, B2, B3 and B4 such that, at each point in time, the gradual decrease of the average brake force applied to the wheel axles 132, 133 and 134 except the specific wheel axles 131 corresponds to the gradual increase of the brake force applied to the specific wheel axle 131. Namely, thereby the deviating brake force applied to specific wheel axle 131 is masked by the opposite deviation represented by the brake force applied to the wheel axles 132, 133 and 134 except the specific wheel axles 131.

Referring again to FIG. 2, we see a brake unit 101 according to one embodiment of the invention. The brake unit 101 is configured to receive the control signals, e.g. representing a brake command B1 from the controller 140, for example via a data bus 150. In response thereto, the brake unit 101 is configured to execute a brake action. The brake unit 101 may contain a rotatable member 111, first and second pressing members, here symbolized by 211, a brake actuator 220, a gear assembly (not shown) and an electric motor 230. The rotatable member 111, which may be represented by a brake disc or a brake drum is mechanically linked to at least one wheel 121 of the rail vehicle 100. Specifically, in response to the brake command B1, the brake actuator 220 is preferably configured to produce a brake force signal BF1 to the electric motor 230, which, in turn, causes the electric motor 230 to cause the first and second pressing members 211 to move relative to the rotatable member 111.

It should be pointed out that, according to the invention, the electric motor 230 may be replaced by a pneumatically operated piston-and-cylinder arrangement configured to actuate the first and second pressing members 211.

Further, for the overall efficiency, the data bus 150 may, of course, be configured to transmit the all the control signals B1, B2, B3 and B4 from the controller 140 to each brake unit in the set of brake units 101, 102, 103 and/or 104.

Each of the first and second pressing members 211 is configured to move relative to the rotatable member 111 to execute the brake action. Typically, the brake action involves applying a particular brake force on the rotatable member 111. However, the brake action may also involve reducing or releasing an already applied brake force.

Figure 4:
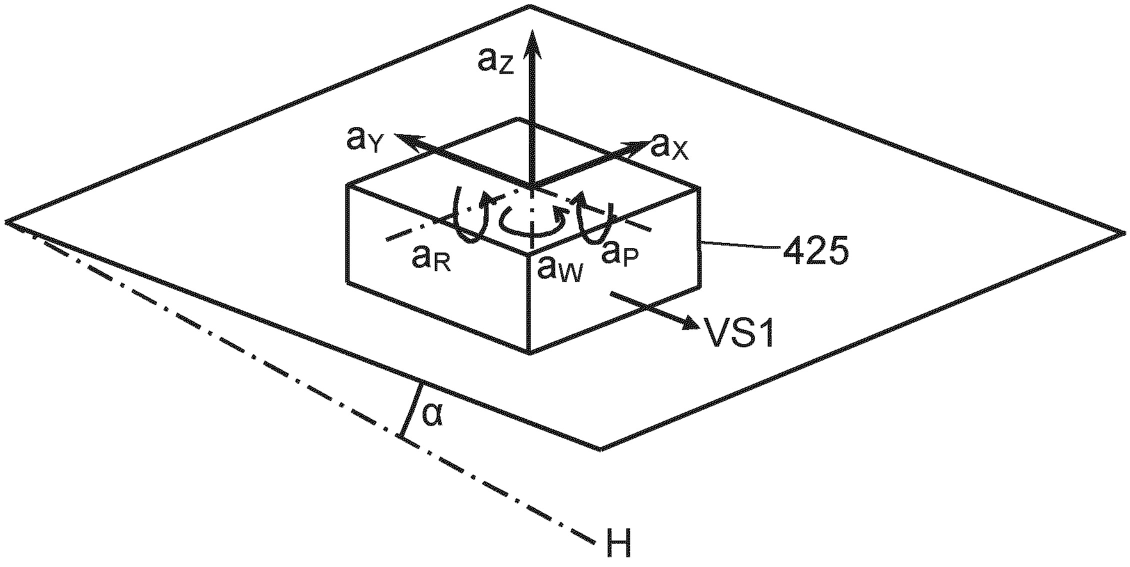
FIG. 4 schematically illustrates an accelerometer according to one embodiment of the invention.

Referring now to FIGS. 4 and 5, according to one embodiment of the invention, the controller 140 contains at least one interface 511 and 512 configured to receive first and second vector signals VS1 and VS2 respectively. The first vector signal VS1 expresses an acceleration ax, ay, az, $a_R$, $a_P$, and/or aw of the rail vehicle 100 in at least one dimension, for instance linearly in one or more spatial directions and/or rotations around one or more of these directions. The second vector signal VS2 expresses a respective rotational movement of the wheels 121*a*, 121*b*; 122*a*, 122*b*; 123*a*, 123*b* and 124*a*, 124*b* on each of the wheel axles. Consequently, since each wheel is configured to rotate around a respective one of the wheel axles, the rotational movement is performed in a plane being orthogonal to a respective rotation axis of the wheel axle.

The controller 140 is configured to obtain the wheel speed signals indicating the respective rotational speeds $\omega_1$, $\omega_2$, $\omega_3$ and $\omega_4$ based on the first and second vector signals VS1 and VS2 by applying physical mechanics algorithms known in the art. Of course, determining the average rotational speed $\omega_a$ is trivial once each of the individual rotational speeds $\omega_1$, $\omega_2$, $\omega_3$ and $\omega_4$ is known.

FIG. 4 schematically illustrates a first accelerometer 425 according to one embodiment of the invention. The first accelerometer 425 is arranged in a frame element 110 of the rail vehicle 100. The first accelerometer 425 is configured to produce the first vector signal VS1 representing an acceleration of the a rail vehicle 100 in at least one dimension, typically in each of the three spatial directions ax, ay and az and respective rotations $a_R$, $a_P$ and aw around axes along each of these directions.

Preferably, according to one embodiment of the invention, the first vector signal VS1 further expresses an inclination angle $\alpha$ of the rail vehicle 100 relative to a horizontal plane H. Here, the controller 140 is configured to adjust the power signal $P_m$ indicating the amount of power produced by the onboard motor and/or the speed signal indicating the second speed $v_2$ based on the inclination angle $\alpha$ when estimating the overall weight $m_{tot}$ of the rail vehicle 100. Consequently, the estimate of the overall weight $m_{tot}$ may be adequately adjusted if the rail vehicle 100 travels on non-horizontal ground when obtaining the power signal $P_m$ and the speed signal, such that in an uphill slope the part of the motor power that is converted into potential energy is discarded; and conversely, in a downhill slope the part of the kinetic energy originating from potential energy is discarded.

Naturally, for the same reasons, it is also preferable to compensate for the inclination angle $\alpha$ when repeatedly executing the above steps (a) to (c) to estimate the respective fraction $m_1$, $m_2$, . . . , $m_n$ of the overall weight $m_{tot}$ carried by each of the wheel axles 131, 132, 133 and 134 of the rail vehicle 100.

FIG. 2 illustrates a second accelerometer 235 that is eccentrically arranged relative to a rotation axis of at least one wheel, say 121. The second accelerometer 235 is configured to produce the second vector signal VS2 expressing movements of the second accelerometer 235 in a plane orthogonal to the rotation axis of the at least one wheel 121, and transmit a signal containing the second vector signal VS2 to the controller 140.

FIG. 5 shows a block diagram of the controller 140 according to one embodiment of the invention. The controller 140 includes processing cir-cuitry in the form of at least one processor 530 and a memory unit 520, i.e. non-volatile data carrier, storing a computer program 525, which, in turn, contains software for making the at least one processor 530 execute the actions mentioned in this disclosure when the computer program 525 is run on the at least one processor 530.

The controller 140 contains input interfaces configured to receive the first and second vector signals VS1 and VS2 respectively and the power signal $P_m$ and the speed signal expressing the speeds $v_1$ and $v_2$ respectively. Further, the controller 140 contains outputs configured to provide the control signals B1, B2, B3 and B4 information about the individual axle weights, such as the respective fractions $m_1$, $m_2$, . . . , $m_n$ of the overall weight $m_{tot}$. As mentioned above, one or more of the input and/or output signals may be communicated via the data bus 150.

According to one embodiment of the invention, the controller 140 is configured to provide the respective fractions $m_1$, $m_2$, . . . , $m_n$ of the overall weight $m_{tot}$ to each braking controller 161, 162, 163 and 164 to enable the braking controllers to cause its associated brake actuator 220 to produce a respective appropriate brake force signal BF1. The appropriate brake force signal BF1 is here a brake force signal that is based on the respective fraction $m_1$ of the overall weight $m_{tot}$ applicable to the wheel axle in question, e.g. 131.

According to one embodiment of the invention, the controller 140 is co-located with the braking controller. Thus, for example, the controller 140 may be integrated into the braking controller 161, or vice versa. Alternatively, the functionality of the controller 140 may be distributed over two or more of the braking controllers 161, 162, 163 and/or 164.

Figure 6:
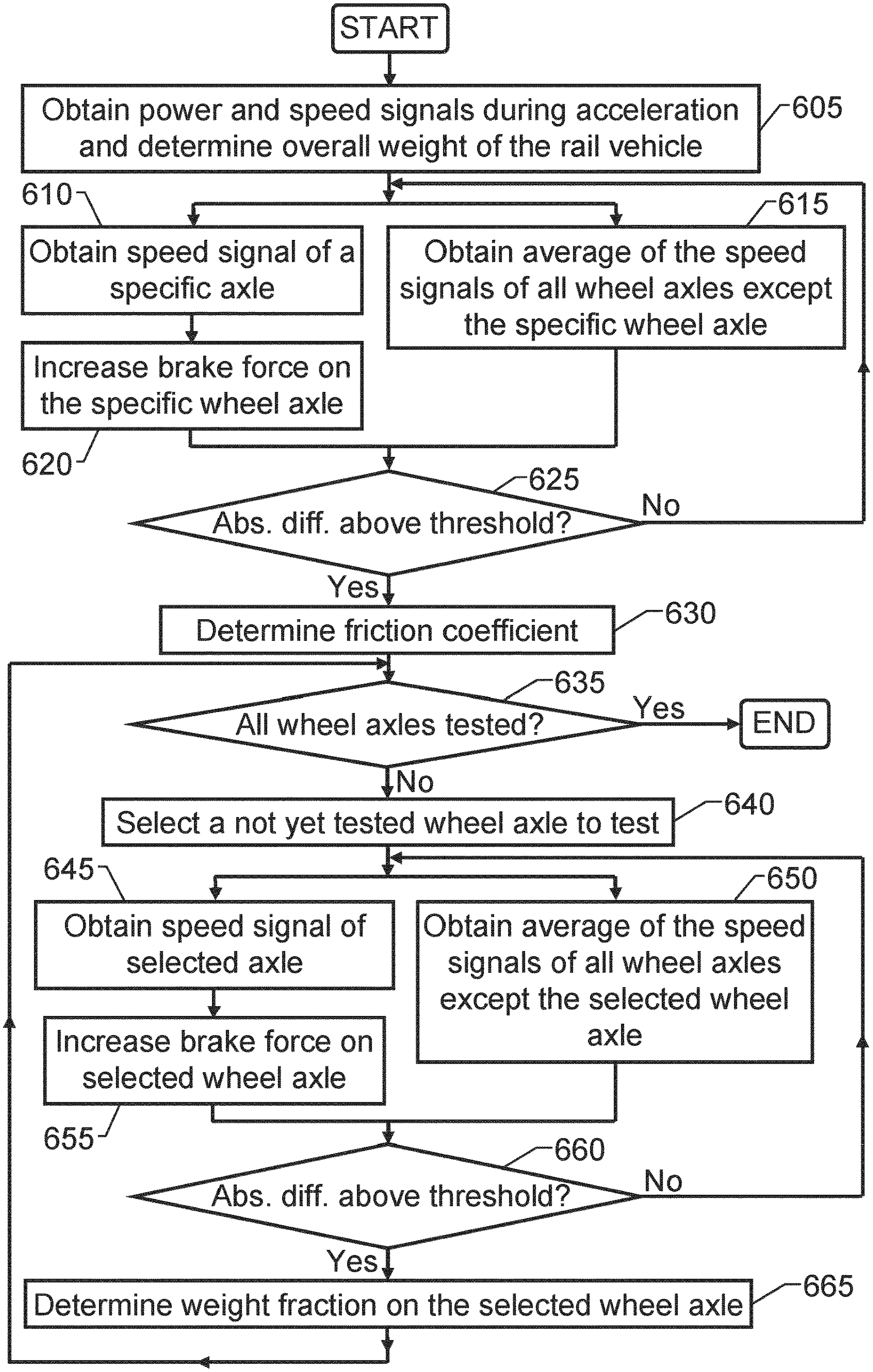
FIG. 6 illustrates, by means of a flow diagram, the general method according to the invention.

In order to sum up, and with reference to the flow diagram in FIG. 6, we will now describe the computer-implemented method for a rail vehicle that is carried out by the controller 140.

In a first step 605, signals are obtained that express first and second speeds $v_1$ and $v_2$ and an amount of power produced by a motor onboard the rail vehicle 100 to accelerate it from the first speed $v_1$ to the second speed $v_2$.

In a step 610 thereafter, a speed signal is obtained, which indicates a rotational speed $\omega_1$ of a specific one the rail vehicle's 100 wheel axles, say 131. In a step 615, preferably essentially parallel to step 610, an average value is obtained, which represents an average $\omega_a$ of the rotational speeds $\omega_2$, $\omega_3$ and $\omega_4$ of the rail vehicle's 100 wheel axles 132, 133 and 134 except the specific wheel axle 131.

In a step 620 subsequent to step 610 and preferably essentially parallel to step 615, a brake control signal is produced that is configured to cause a brake unit to apply an increased brake force to the specific wheel axle 131.

Thereafter, a step 625 checks if an absolute difference $|\omega_1-\omega_a|$ between the rotational speed of the specific wheel axle 131 and the average rotational speed $\omega_a$ of the wheel axles except the specific wheel axle exceeds a threshold value. If so, a step 630 follows. Otherwise, the procedure loops back to steps 610 and 615.

In step 630, a parameter $\mu_m$ is determined that reflects a friction coefficient $\mu_e$ between the wheels 121*a* and 121*b* on the specific wheel axle 131 and the rails 181 and 182 upon which the rail vehicle 100 travels.

Subsequently, a step 635 checks if all the wheel axles 131, 132, 133 and 134 of the rail vehicle 100 have been tested. If so, the procedure ends. If not, the procedure continues to a step 640 in which a not yet tested wheel axle is selected.

Then, in a step 645, a speed signal is obtained, which indicates a rotational speed $\omega_1$ of the selected wheel axle.

In a step 650, preferably essentially parallel to step 645, an average value is obtained, which represents an average $\omega_a$ of the rotational speeds of the rail vehicle's 100 wheel axles except the selected wheel axle.

In a step 655 subsequent to step 645 and preferably essentially parallel to step 650, a brake control signal is produced that is configured to cause a brake unit to apply an increased brake force to the selected wheel axle. Thereafter, a step 660 checks if an absolute difference between the rotational speed of the selected wheel axle and the average rotational speed $\omega_a$ of the wheel axles except the selected wheel axle exceeds a threshold value. If so, a step 665 follows. Otherwise, the procedure loops back to steps 645 and 650.

In step 665, a respective fraction of the overall weight $m_{tot}$ carried by the selected wheel axle is estimated. Thereafter, the procedure loops back to step 635. It should be noted that the fraction of the overall weight $m_{tot}$ carried by the first wheel axle may be determined as a remaining faction of the overall weight $m_{tot}$ when the respective fractions on all the other wheel axles have been determined.

All of the process steps, as well as any sub-sequence of steps, described with reference to FIG. 6 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a trans-missible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for per-forming, or for use in the performance of, the relevant processes.

The term "comprises/comprising" when used in this specification is taken to specify the presence of stated features, integers, steps or components. The term does not preclude the presence or addition of one or more additional elements, features, integers, steps or components or groups thereof. The indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

It is also to be noted that features from the various embodiments described herein may freely be combined, unless it is explicitly stated that such a combination would be unsuitable.

Variations to the disclosed embodiments can be understood and effected by those skilled in the art in practicing the claimed invention, from a study of the drawings, the disclosure, and the appended claims.

The invention is not restricted to the described embodiments in the figures, but may be varied freely within the scope of the claims.

The invention claimed is:

1. A controller (140) for estimating individual axle weights of a rail vehicle (100) comprising a number of wheel axles (131, 132, 133, 134) and a set of brake units (101, 102, 103, 104) configured to apply a respective brake force to each of the wheel axles (131, 132, 133, 134) to cause retardation of the rail vehicle (100), which controller (140) is configured to obtain:

a power signal (Pm) indicating an amount of power produced by an onboard motor to accelerate the rail vehicle (100) from a first speed (v1) to a second speed (v2), a speed signal indicating respective values of the first and second speeds (v1, v2), and based thereon estimate an overall weight (mtot) of the rail vehicle (100), wherein the controller (140) is further configured to:

(a) obtain wheel speed signals indicating respective rotational speeds (ω1, ω2, ω3, ω4) of the wheel axles (131, 132, 133, 134), (b) produce a brake control signal (B1) to a specific brake unit (101) in the set of brake units such that this brake unit applies a gradually increasing brake force to a specific wheel axle (131) of said wheel axles, (c) determine, repeatedly during production of the brake control signal (B1), an absolute difference (|ω1−ωa|) between the rotational speed of the specific wheel axle (131) and an average rotational speed (wa) of said wheel axles except the specific wheel axle; and in response to the absolute difference exceeding a threshold value, (d) determine a parameter (μm) reflecting a friction coefficient (μe) between a pair of wheels (121*a*, 121*b*) on the specific wheel axle (131) and a pair of rails (181, 182) upon which the rail vehicle (100) travels, and repeat steps (a) to (c) for each of said wheel axles, and based thereon estimate a respective fraction (m1, m2, mn) of the overall weight (mtot) carried by each of said wheel axles, wherein the controller (140) is configured to provide the respective fractions (m1, m2, mn) of the overall weight (mtot) to a braking controller to enable the braking controller to produce a respective brake force signal (BF1) to each brake unit (101) in the set of brake units (101, 102, 103, 104), which respective brake force signal (BF1) is based on the respective fractions (m1, m2, mn) of the overall weight (mtot).

2. The controller (140) according to claim 1, comprising at least one interface (511, 512) configured to receive first and second vector signals (VS1, VS2), wherein the first vector signal (VS1) expresses an acceleration (aX, aY, aZ, aR, aP, aW) of the rail vehicle (100) in at least one dimension, the second vector signal (VS2) expresses a respective rotational movement of the wheels (121*a*, 121*b*; 122*a*, 122*b*; 123*a*, 123*b*; 124*a*, 124*b*) on each wheel axle of said wheel axles (131, 132, 133, 134), which rotational movement is performed in a plane orthogonal to a respective rotation axis of the wheel axle, and the controller (140) is configured to obtain the wheel speed signals indicating the respective rotational speeds (ω1, ω2, ω3, ω4) based on the first and second vector signals (VS1, VS2).

3. The controller (140) according to claim 2, wherein the first vector signal (VS1) further expresses an inclination angle (a) of the rail vehicle (100) relative to a horizontal plane (H), and the controller (140) is configured to adjust at least one of the power signal (Pm) indicating the amount of power produced by the onboard motor and the speed signal indicating the second speed (v2) based on the inclination angle (a) when estimating the overall weight (mtot) of the rail vehicle (100).

4. The controller (140) according to claim 1, wherein the controller (140) is co-located with the braking controller (161, 162, 163, 164).

5. The controller (140) according to claim 1, wherein the controller (140) is configured to transmit the brake control signal (B1, B2, B3, B4) via a data bus (150) in the rail vehicle (100).

6. A computer-implemented method for estimating individual axle weights of a rail vehicle (100) comprising a number of wheel axles (131, 132, 133, 134) and a set of brake units (101, 102, 103, 104) configured to apply a respective brake force to each of the wheel axles (131, 132, 133, 134) to cause retardation of the rail vehicle (100), said method is performed in at least one processor (530) and comprises:

obtaining a power signal (Pm) indicating an amount of power produced by an onboard motor to accelerate the rail vehicle (100) from a first speed (v1) to a second speed (v2), obtaining a speed signal indicating respective values of the first and second speeds (v1, v2), and based thereon, estimating an overall weight (mtot) of the rail vehicle (100), by:

(a) obtaining wheel speed signals indicating respective rotational speeds (ω1, ω2, ω3, ω4) of the wheel axles (131, 132, 133, 134), (b) producing a brake control signal (B1) to a specific brake unit (101) in the set of brake units such that this brake unit applies a gradually increasing brake force to a specific wheel axle (131) of said wheel axles, (c) determining, repeatedly during production of the brake control signal (B1), an absolute difference (ω1−ωa|) between the rotational speed of the specific wheel axle (131) and an average rotational speed (ωa) of said wheel axles except the specific wheel axle; and in response to the absolute difference exceeding a threshold value, (d) determining a parameter (μm) reflecting a friction coefficient (μe) between a pair of wheels (121*a*, 121*b*) on the specific wheel axle (131) and a pair of rails (181, 182) upon which the rail vehicle (100) travels, repeating steps (a) to (c) for each of said wheel axles, and based thereon estimating a respective fraction (m1, m2, mn) of the overall weight (mtot) carried by each of said wheel axles, further comprising: providing the respective fractions (m1, m2, mn) of the overall weight (mtot) to a braking controller to enable the braking controller to produce a respective brake force signal (BF1) to each brake unit (101) in the set of brake units (101, 102, 103, 104), which respective brake force signal (BF1) is based on the respective fractions (m1, m2, mn) of the overall weight (mtot).

7. The method according to claim 6, comprising:

receiving first and second vector signals (VS1, VS2) via at least one interface (511, 512), which first vector signal (VS1) expresses an acceleration (aX, aY, aZ, aR, aP, aW) of the rail vehicle (100) in at least one dimension, which second vector signal (VS2) expresses a respective rotational movement of the wheels (121*a*, 121*b*; 122*a*, 122*b*; 123*a*, 123*b*; 124*a*, 124*b*) on each wheel axle of said wheel axles (131, 132, 133, 134), which rotational movement is performed in a plane orthogonal to a respective rotation axis of the wheel axle, and obtaining the wheel speed signals indicating the respective rotational speeds (ω1, ω2, ω3, ω4) based on the first and second vector signals (VS1, VS2).

8. The method according to claim 7, wherein the first vector signal (VS1) further expresses an inclination angle (a) of the rail vehicle (100) relative to a horizontal plane (H), and the method comprises:

adjusting at least one of the power signal (Pm) indicating the amount of power produced by the onboard motor and the speed signal indicating the second speed (v2) based on the inclination angle (a) when estimating the overall weight (mtot) of the rail vehicle (100).

9. The method according to claim 6, comprising:

transmitting the brake control signal (B1, B2, B3, B4) via a data bus (150) in the rail vehicle (100).

10. A computer program (525) loadable into a non-volatile data carrier (520) communicatively connected to at least one processor (530), the computer program (525) comprising software for executing the method according to claim 6 when the computer program (525) is run on the at least one processor (530).

11. A non-volatile data carrier (520) containing the computer program (425) of the claim 10.

* * * * *